US012783802B2

(12) United States Patent
Lee

(10) Patent No.: US 12,783,802 B2
(45) Date of Patent: Nov. 3, 2026

(54) METHOD OF NATURAL LANGUAGE PROCESSING USING MULTIPLE UNITS FOR NEURAL NETWORK COMPUTATIONS

(71) Applicant: Dnotitia Inc., Seoul (KR)

(72) Inventor: Seungjae Lee, Seoul (KR)

( * ) Notice: Subject to any disclaimer, the term of this patent is extended or adjusted under 35 U.S.C. 154(b) by 117 days.

(21) Appl. No.: 18/924,144

(22) Filed: Oct. 23, 2024

(65) Prior Publication Data

US 2026/0030452 A1 Jan. 29, 2026

(30) Foreign Application Priority Data

Jul. 23, 2024 (KR) ........................ 10-2024-0097051

(51) Int. Cl.

| | |
|---|---|
| ***G06F 40/00*** | (2020.01) |
| ***G06F 40/274*** | (2020.01) |
| ***G06F 40/284*** | (2020.01) |
| *G06F 9/30* | (2018.01) |
| *G06N 3/045* | (2023.01) |
| *G10L 15/16* | (2006.01) |

(52) U.S. Cl.

CPC .......... *G06F 40/284* (2020.01); *G06F 40/274* (2020.01); *G06F 9/30007* (2013.01); *G06N 3/045* (2023.01); *G10L 15/16* (2013.01)

(58) Field of Classification Search

CPC .. G06F 40/284; G06F 40/274; G06F 9/30007; G06F 40/211; G06F 40/253; G06F 40/268; G06F 40/30; G06F 17/18; G10L 15/16; G10L 19/005; G10L 19/00; G10L 25/27; G10L 25/30; G10L 17/18; G10L 15/02; G10L 15/12; G10L 15/063; G10L 15/07; G10L 15/20; G10L 15/26; G10L 15/22; G10L 15/30; G10L 15/1822; G10L 15/183; G10L 15/193; G10L 15/19; G06N 3/045; G06N 3/063

See application file for complete search history.

(56) References Cited

U.S. PATENT DOCUMENTS

| | | | | |
|---|---|---|---|---|
| 11,977,916 | B2 | 5/2024 | Kim | |
| 12,287,816 | B1 * | 4/2025 | Pathak | G06F 16/3329 |
| 2014/0189239 | A1 * | 7/2014 | Hum | G06F 12/0811<br>711/122 |

(Continued)

FOREIGN PATENT DOCUMENTS

| | | |
|---|---|---|
| CN | 118013934 A | 5/2024 |
| KR | 102647686 B1 | 3/2024 |

OTHER PUBLICATIONS

Notification of Reasons for Refusal (Office Action) issued by the Korean Intellectual Property Office in counterpart Korean Patent Application No. 10-2024-0097051, dated May 4, 2026, machine translation attached.

*Primary Examiner* — Vu B Hang
(74) *Attorney, Agent, or Firm* — USX IP LLC

(57) ABSTRACT

As an embodiment of the present disclosure, provided is a method for processing natural language, which is performed in a neural computing apparatus including a plurality of chips, a controller that controls the plurality of chips, and a memory that stores data accessible to the plurality of chips, in which the method includes acquiring a token sequence including one or more tokens, performing a computation on the token sequence using the plurality of chips, and determining a subsequent token of the token sequence as a result of the computation.

7 Claims, 10 Drawing Sheets

(56) References Cited

U.S. PATENT DOCUMENTS

| | | | | |
|---|---|---|---|---|
| 2022/0237435 | A1 | 7/2022 | Huang et al. | |
| 2023/0222318 | A1 | 7/2023 | Lepikhin et al. | |
| 2026/0003695 | A1 * | 1/2026 | Miriyala | G06F 9/505 |

* cited by examiner

METHOD OF NATURAL LANGUAGE PROCESSING USING MULTIPLE UNITS FOR NEURAL NETWORK COMPUTATIONS

CROSS-REFERENCE TO RELATED APPLICATION

This application claims priority to Korean Patent Applications No. 10-2024-0097051, filed in the Korean Intellectual Property Office on Jul. 23, 2024, the entire contents of which are hereby incorporated by reference.

BACKGROUND

Technical Field

The present disclosure relates to a technology for processing natural language using an artificial neural network model, and more specifically, to a natural language processing technology using a plurality of units or computational entities that perform neural computations.

Description of Related Art

Recently, it has been recognized in the field of natural language processing technology that high natural language processing performance can be expected by using large language model (LLM) as the base model. However, as demand for the functions and accuracy of the LLM increase, the amount of data computation and the size of model parameters of LLM are increasing exponentially, resulting in increased cost and time.

As a result, there is an increasing demand in the industry for ways to reduce costs while maintaining performance by efficiently using a large number of parameters included in the LLM.

Korean Patent No. 10-2647686 B1 discloses "Neural network processing unit configured to drive a quantized artificial neural network model."

SUMMARY

In order to solve one or more problems (e.g., the problems described above and/or other problems not explicitly described herein), the present disclosure provides a technology for processing natural language using an artificial neural network model.

As an example of the present disclosure, a method for processing natural language is provided, which may be performed in a neural computing apparatus including a plurality of chips, a controller that controls the plurality of chips, and a memory that stores data accessible to the plurality of chips. The method may include acquiring a token sequence including one or more tokens, performing a computation on the token sequence using the plurality of chips, and determining a subsequent token of the token sequence as a result of the computation.

Each of the plurality of chips may include a self-attention unit that computes an attention score of a token in an input sequence, a layer normalization unit that performs a layer-level normalization computation, an expert unit that performs a neural computation, and a routing unit that selects an expert unit suitable for a specific neural computation.

The performing the computation on the token sequence using the plurality of chips may include by a self-attention unit included in a first chip of the plurality of chips, calculating an attention score for the token sequence, by a routing unit included in the first chip, determining that an expert unit included in a second chip of the plurality of chips is an expert unit corresponding to the token sequence, and by the expert unit of the second chip, performing a computation based on an output of a self-attention unit of the first chip for the token sequence.

The method may further include, by a self-attention unit included in each of the chips other than the first chip of the plurality of chips, calculating an attention score for the token sequence.

The method may further include, by the first chip, storing, in the memory, K-V cache data derived in a process of calculating the attention score, in which the plurality of chips may share the K-V cache data through the memory.

The method may further include, by the first chip, transmitting a K-V pair newly generated in a process of calculating the attention score to a third chip of the plurality of chips, in which the plurality of chips may share the K-V pair according to a ring-type data sharing method.

As an example of the present disclosure, a method for processing natural language is provided, which may be performed in a neural computing processor including a plurality of cores, a controller that controls the plurality of cores, and a memory that stores data accessible to the plurality of cores. The method may include acquiring a token sequence including one or more tokens, performing a computation on the token sequence using the plurality of cores; and determining a subsequent token of the token sequence as a result of the computation.

Each of the plurality of cores may include a self-attention unit that computes an attention score of a token in an input sequence, a layer normalization unit that performs a layer-level normalization computation, an expert unit that performs a neural computation, and a routing unit that selects an expert unit suitable for a specific neural computation.

The performing the computation on the token sequence using the plurality of cores may include by a self-attention unit included in a first core of the plurality of cores, calculating an attention score for the token sequence, by a routing unit included in the first core, determining that an expert unit included in a second core of the plurality of cores is an expert unit corresponding to the token sequence, and by the expert unit of the second core, performing a computation based on an output of a self-attention unit of the first core for the token sequence.

The method may further include, by the self-attention unit included in each of the cores other than the first core of the plurality of cores, calculating the attention score for the token sequence.

The method may further include, by the first core, storing, in the memory, K-V cache data derived in a process of calculating the attention score, in which the plurality of cores may share the K-V cache data through the memory.

The method may further include, by the first core, transmitting a K-V pair newly generated in a process of calculating the attention score to a third core of the plurality of cores, in which the plurality of cores may share the K-V pair according to a ring-type data sharing method.

As an example of the present disclosure, a method for processing natural language is provided, which may be performed in a neural computing system including a plurality of nodes that includes a communication interface and an input and output interface, a controller that controls the plurality of nodes, and a memory that stores data accessible to the plurality of nodes. The method may include acquiring a token sequence including one or more tokens, performing a computation on the token sequence using the plurality of nodes, and determining a subsequent token of the token sequence as a result of the computation.

The performing the computation on the token sequence using the plurality of nodes may include by a self-attention unit included in a first node of the plurality of nodes, calculating an attention score for the token sequence, by a routing unit included in the first node, determining that an expert unit included in a second node of the plurality of nodes is an expert unit corresponding to the token sequence, and by the expert unit of the second node, performing a computation based on an output of a self-attention unit of the first node regarding the token sequence.

The method may further include, by the first node, transmitting a K-V pair newly generated in a process of calculating the attention score to a third node of the plurality of nodes, in which the plurality of nodes may share the K-V pair according to a ring-type data sharing method.

The method for processing natural language according to one or more aspects of the present disclosure can efficiently drive a natural language processing model using relatively little memory and resources.

The method for processing natural language according to one or more aspects of the present disclosure can efficiently utilize a plurality of chips and thus drive the natural language processing model with less memory and resources.

The method for processing natural language according to one or more aspects of the present disclosure can efficiently synchronize K-V cache data among a plurality of computational entities.

BRIEF DESCRIPTION OF THE DRAWINGS

The above and other objects, features and advantages of the present disclosure will become more apparent to those of ordinary skill in the art by describing in detail examples thereof with reference to the accompanying drawings, in which.

DETAILED DESCRIPTION

Figure 1:
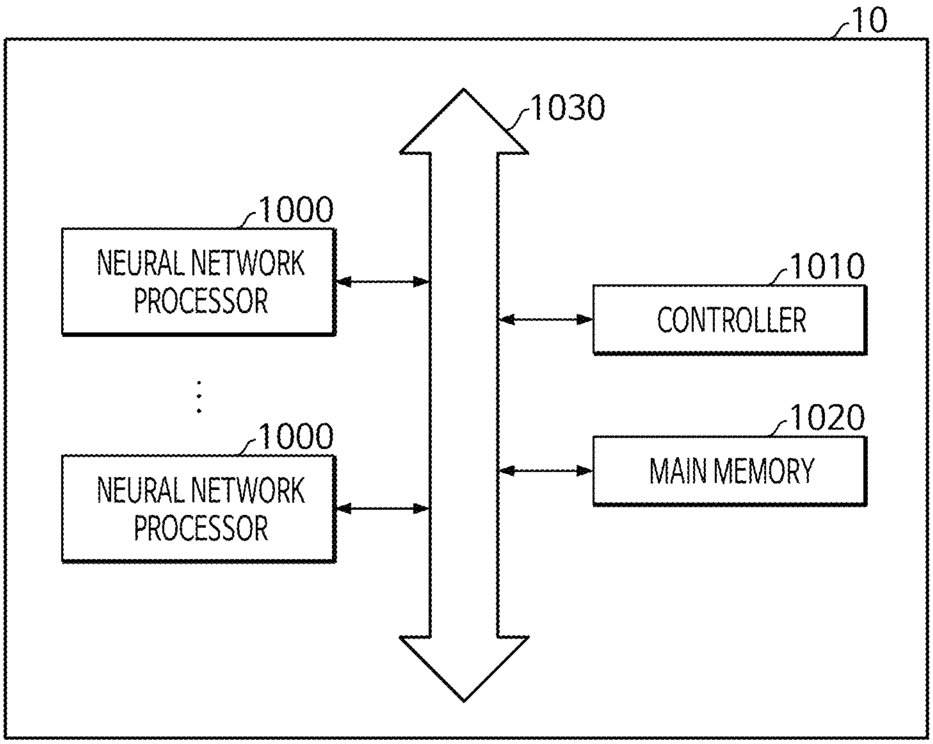
FIG. 1 is a conceptual diagram provided to explain a neural computing apparatus according to an example of the present disclosure.

Various examples described herein are illustrated for the purpose of clearly explaining the technical idea of the present disclosure and are not intended to be limited to a specific example. The technical idea of the present disclosure includes various modifications, equivalents, alternatives, and embodiment(s) selectively combining all or part of each embodiment described herein. In addition, the scope of the technical idea of the present disclosure is not limited to the various examples presented below or detailed descriptions thereof.

Unless otherwise defined, the terms used herein, including technical or scientific terms, may have meanings generally understood by those skilled in the art to which the present disclosure belongs.

The expressions such as “comprise”, “may comprise”, “include”, “may include”, “have”, “may have”, etc. as used herein are intended to mean the presence of a characteristic (e.g., function, operation, component, etc.) and do not exclude the presence of other additional characteristics. That is, these expressions should be understood as open-ended terms that encompass the possibility that other examples are included.

A singular expression used herein may include the meaning of the plural unless otherwise stated in the context, which also applies to the singular expression described in the claims.

Expressions such as “first” or “second” as used herein are used to distinguish one object from another in referring to multiple similar objects, unless otherwise indicated in context, and do not limit the order or importance between them. For example, a plurality of chips according to the present disclosure may be distinguished from each other by referring them as “first chip”, “second chip”, respectively.

Expressions such as “A, B, and C”, “A, B, or C”, “at least one of A, B, and C”, “at least one of A, B, or C”, etc. as used herein may mean each listed item or all possible combinations of the listed items. For example, “at least one of A or B” may refer to all of: (1) at least one A; (2) at least one B; (3) at least one A and at least one B.

The term “unit” as used herein may refer to software, or hardware component such as Field-Programmable Gate Array (FPGA), Application Specific Integrated Circuit (ASIC), etc. However, “unit” is not limited to hardware and software. The “unit” may be configured to be stored in an addressable storage medium, or may be configured to execute one or more processors. The “unit” may include components such as software components, object-oriented software components, class components, and task components, as well as processors, functions, attributes, procedures, subroutines, segments of program code, drivers, firmware, microcode, circuits, data, databases, data structures, tables, arrays, and variables.

The expression “based on” as used herein is intended to describe one or more factors that influence an act or operation of determining or deciding described in a phrase or sentence including that expression, and this expression does not exclude any additional factors that influence the act or operation of determining or deciding.

When it is described that a component (e.g., a first component) is “connected” or “coupled” to another component (e.g., a second component) as used herein, it may mean that the component is not only directly connected or coupled to another component, but also connected or coupled through yet another component (e.g., a third component).

Depending on the context, the expression “configured to” as used herein may have meanings such as “set to”, “with the ability to”, “modified to”, “made to”, “to be able to”, etc. This expression is not limited to the meaning of “specially designed in hardware to”. For example, a processor configured to perform a specific operation may refer to a generic purpose processor capable of performing the specific operation by executing software, or to a special purpose computer structured through programming to perform the specific operation.

In the present disclosure, artificial intelligence (AI) refers to a technology that imitates human learning ability, reasoning ability, and perceptual ability, and implements these abilities with a computer, and may include the concepts of machine learning and symbolic logic. Machine learning (ML) may be an algorithm technology that self-classifies or learns features of input data. Artificial intelligence technology is an algorithm for machine learning, which analyzes input data, learns the results of the analysis, and makes determinations or predictions based on the results of learning. In addition, technologies that simulate the cognitive and determination functions of the human brain using machine learning algorithms can also be understood as a category of artificial intelligence. For example, technical fields of linguistic understanding, visual understanding, reasoning/prediction, knowledge representation, and motion control may be included.

In the present disclosure, machine learning may mean a process of training a neural network model using the experience of processing data. It may mean that computer software improves data processing power by itself through machine learning. The neural network model is built by modeling a correlation between data, and the correlation may be expressed by a plurality of parameters. The artificial neural network model extracts and analyzes features from given data to derive correlations between the data, and it can be said that the machine learning optimizes the parameters of the neural network model by repeating this process. For example, the artificial neural network model may learn the mapping (correlation) between inputs and outputs for data given as input and output pairs. Alternatively, even when only input data is given, the artificial neural network model may derive regularity between the given data and learn the relationship.

In the present disclosure, the artificial neural network, the artificial intelligence learning model, the machine learning model, or the artificial neural network model may be designed to implement a human brain structure on a computer, and may include a plurality of network nodes that simulate neurons of a human neural network and have weights. The plurality of network nodes may have a connection relationship with each other by simulating synaptic activity of neurons that transmit and receive signals through synapses. In an artificial neural network, a plurality of network nodes positioned on layers of different depths may exchange data according to a convolution connection relationship. For example, the artificial neural network may be an artificial neural network model, a convolutional neural network, etc.

Hereinafter, various examples of the present disclosure will be described with reference to the accompanying drawings. In the accompanying drawings and the description of the drawings, the same reference numerals may be assigned to the same or substantially equivalent components. In addition, in the following description of the various examples, duplicate descriptions of the same or corresponding components may be omitted, but this does not mean that such components are not included in the example.

In the present disclosure, the neural processing unit may be used as a term referring to an independent electronic device or apparatus that performs a computation related to the artificial neural network model. In the present disclosure, the neural processing unit may be implemented as an individual chip (or processor), an individual core, or an individual node.

Hereinafter, a first example in which the neural processing unit is implemented as a processor will be described with reference to FIGS. 1 to 3. In the present disclosure, if the neural processing unit is implemented as a processor, an electronic device including one or more of these processors may be referred to as a "neural computing apparatus".

FIG. 1 is a conceptual diagram illustrating a neural computing apparatus according to an example of the present disclosure.

Referring to FIG. 1, a neural computing apparatus 10 may include at least one neural network processor 1000, a controller 1010, a main memory 1020, and a data bus 1030.

The neural network processor 1000 may be a computation unit for performing an artificial neural network-related computation. The neural network processor 1000 may be a semiconductor implemented with an electric/electronic circuit (e.g., including a transistor, a capacitor, etc.). In the present disclosure, the neural network processor 1000 may be referred to as a chip that corresponds to a physical semiconductor. The neural network processor 1000 may be a control device that controls individual accessory devices of the neural computing apparatus 10 and executes computation of a program.

The controller 1010 may be a general-purpose computing device for the overall computation of the neural computing apparatus 10. The controller 1010 may be a kind of host that provides an instruction to each of one or more neural network processors 1000. That is, the neural network processor 1000 may perform parallel computation, such as performing an artificial neural network-related computation according to the instruction of the controller 1010.

The main memory 1020 may be a device for storing data used by the controller 1010 or one or more neural network processors 1000. For example, the main memory 1020 may be a system memory such as DRAM.

Components included in the neural computing apparatus 10 may communicate with each other through the data bus 1030, respectively. In the present disclosure, the data bus 1030 may be referred to as a communication bus and/or a system bus, etc.

Although not illustrated, the neural computing apparatus 10 may further include an external interface connected to an external device for data transmission and reception, and the controller 1010 may exchange data with other external electronic devices through the external interface.

Figure 2:
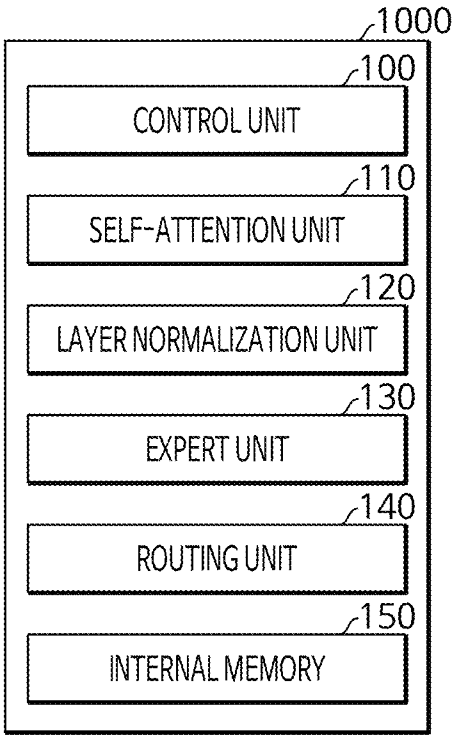
FIG. 2 is a block diagram provided to explain the neural network processor of FIG. 1 in detail.

FIG. 2 is a block diagram provided to explain the neural network processor of FIG. 1 in detail;

Referring to FIG. 2, the neural network processor 1000 may include a control unit 100, a self-attention unit 110, a layer normalization unit 120, an expert unit 130, a routing unit 140, and an internal memory 150. Each of the control unit 100, the self-attention unit 110, the layer normalization unit 120, the expert unit 130, and the routing unit 140 may be a semiconductor circuit with a large number of connected transistors.

The internal memory 150 may be a caching memory that exists separately from the main memory 1020. For example, the internal memory 150 may be configured as a memory device such as SRAM, MRAM, etc. that is relatively faster to read and write than the main memory 1020 described above. The internal memory 150 may refer to a memory that is substantially used only for the computation of the neural network processor 1000. In other words, the internal memory 150 may be a buffer memory and/or a cache memory configured to store weights, kernels, and/or feature maps necessary for the computation of each unit included in the neural network processor 1000.

The control unit 100 is a computation device operably connected to the self-attention unit 110, the layer normalization unit 120, the expert unit 130, and the routing unit 140 to be described below, and may control each component included in the neural network processor 1000.

Each of the self-attention unit 110, the layer normalization unit 120, the expert unit 130, and the routing unit 140 included in the neural network processor 1000 may be configured to perform functions such as addition, multiplication, accumulation, etc. required for artificial neural computation on data such as a vector and a tensor. That is, each of the self-attention unit 110, the layer normalization unit 120, the expert unit 130, and the routing unit 140 may be a unit configured to perform, on a task-by-task basis, multiplication and accumulation (MAC) computations required for artificial neural computations.

The artificial neural computation performed by the self-attention unit 110, the layer normalization unit 120, the expert unit 130, and the routing unit 140 may be an artificial neural computation for natural language processing.

In natural language processing, text data, that is, data to be processed is converted into a computer-recognizable and computable data form and is used. In this conversion process, tokenization task that divides the text data into certain units, and embedding task that converts individual tokens into vector values that can be recognized and processed by computers may be performed. The embedding task refers to the task of transforming each token generated through the tokenization task into an embedding vector, and may be generated by various techniques such as Glove, FastText, Word2Vec, etc.

In the present disclosure, a token sequence refers to an ordered array of one or more consecutive tokens. The token sequence may include a start token indicating the beginning of a sentence or an end token indicating the end of a sentence. For example, the token sequence generated for the sentence "Hello" may include ["He", "ll", "o <EOS>"]. The token sequence may be represented by numerical data such as vector or tensor through embedding tasks.

Figure 3:
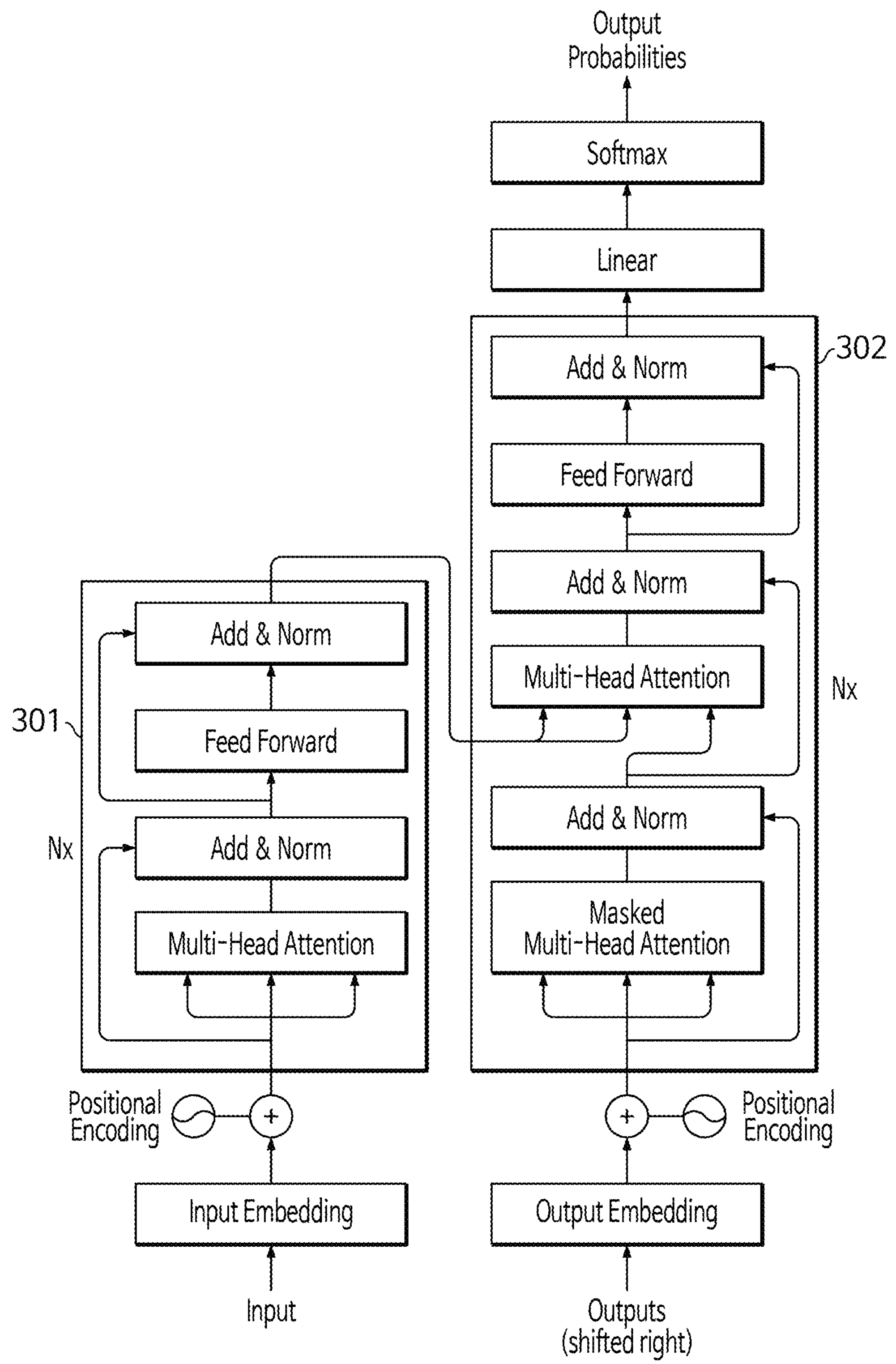
FIG. 3 is a conceptual diagram illustrating a process of processing natural language in an artificial neural network model of a generally used encoder-decoder structure.

FIG. 3 is a conceptual diagram illustrating a process of processing natural language in an artificial neural network model of a generally used encoder-decoder structure.

Referring to FIG. 3, input text data corresponding to an input of an artificial neural network model is converted into a vector through embedding task and positional embedding task and is input to an encoder 301. The encoder 301 repeats a predetermined computation multiple times (Nx) to generate an encoding vector (h) as an output corresponding to the input vector.

In FIG. 3, a decoder 302 of the artificial neural network model may generate the output of the current step (e.g., t) using the output of the decoder 302 and the output of the encoder 301 for the previous step (e.g., t−1). Specifically, the decoder 302 may generate a query vector by multiplying the decoder output of the previous step by the query weight and may generate a key vector by multiplying the output of the encoder by the key weight. The decoder 302 may calculate an element-by-element attention score between the query vector and the key vector and calculate an attention weight by taking a softmax function. The decoder 302 may perform weighted-summing of the attention weight with the value vector generated by multiplying the value weight by the output of the encoder to generate the output vector of the decoder 302. The decoder 302 may generate a final context vector by repeating this process multiple times (Nx). The artificial neural network model of FIG. 3 may perform a computation such as a feed forward network on the final context vector generated as described above to determine the token of the next step.

The neural network processor 1000 of FIG. 2 may be a device configured to perform a computation corresponding to the role of the encoder 301 or the decoder 302 described in FIG. 3.

The self-attention unit 110 of FIG. 2 may include at least one of a multi-head self-attention unit or a masked multi-head self-attention unit.

Self-attention is a concept including the importance of each token included in the input sequence by performing a neural computation on the input sequence, and may be a computation of generating an output vector having the same dimension as the input vector. For example, the attention score for the self-attention computation may be defined as Equation 1 below.

$$\text{Attention}(Q, K, V) = \text{softmax}\left(\frac{Q \cdot K^T}{\sqrt{d_K}}\right)V \qquad \langle\text{Equation 1}\rangle$$

where, Q, K, and V represent a query calculated by applying a query weight ($W_Q$) to an input vector, a key calculated by applying a key weight ($W_K$) to the input vector, and a value calculated by applying a value weight ($W_V$) to the input vector, respectively. softmax represents a softmax function. $d_K$ represents the dimensionality of the key value.

The multi-head self-attention unit may be a unit configured to perform self-attention in parallel by a predetermined number (H). The multi-head self-attention unit may concatenate the output vectors of the individual self-attention unit computed in parallel and perform a matrix computation thereon to generate an output vector having the same dimension as the input vector.

A query weight ($W_{Q\_i}$), a key weight ($W_{K\_i}$), and a value weight ($W_{V\_i}$) for self-attention of each head (i and $0 \le i < H$) used by the multi-head self-attention unit, a weight ($W_M$) for self-attention concatenated as many as the number of multi-heads, etc. may be stored in the main memory 1020 or the internal memory 150.

The masked multi-head self-attention unit may perform an operation similar to the self-attention computation described above, but may perform a masking task on tokens corresponding to a time point after the current time point so that only the time point before the current time point (step t) is referenced. For example, the attention score for the masked self-attention computation may be defined as Equation 2 below.

$$\text{Attention}(Q, K, V) = \text{softmax}\left(\frac{Q \cdot K^T + \text{mask}}{\sqrt{d_K}}\right)V \qquad \langle\text{Equation 2}\rangle$$

where, like Equation 1, Q, K, and V represent a query calculated by applying a query weight ($W_Q$) to an input vector, a key calculated by applying a key weight ($W_K$) to the input vector, and a value calculated by applying a value weight ($W_V$) to the input vector, respectively. In addition, mask represents a masking vector for adding the (t+1)th and subsequent factors of the vector obtained as a result of $Q \cdot K^T$ with a negative number with a relatively large absolute value.

The layer normalization unit 120 may normalize the input vector and output the normalized vector. The layer normalization unit may calculate the average and variance for each dimension of the input vector, and may normalize each element of the input through the average and variance. For example, the normalization computation may be defined as Equation 3 below.

$$\hat{x}_i = \frac{x_i + \mu}{\sqrt{\sigma^2 + \epsilon}} \quad \text{(Equation 3)}$$

where, $x_i$ represents the (i)th element of the vector input to the layer normalization unit, μ represents the average of input vector element values, $\sigma^2$ represents the variance of input vector element values, and ϵ represents a factor that may be any small real number to prevent the denominator from becoming zero.

The layer normalization unit 120 may perform scale and shift tasks as illustrated in Equation 4 below based on each normalized element value.

$$LayerNorm(x_i) = \gamma\hat{x}_i + \beta \quad \text{(Equation 4)}$$

where, γ is a scaling factor and β is a shifting factor, each representing a trainable factor through backpropagation.

The expert unit 130 may be a device that calculates an output vector with respect to an input vector using a feed forward neural network. The feed forward neural network may have a so-called multilayer perceptron structure and may include at least one feed forward layer and at least one active layer. For example, the active function of the feed forward neural network may include a ReLU function, etc. The weight matrix or trainable parameters used in the feed forward neural network may be stored in the internal memory 150 of the neural network processor 1000.

The routing unit 140 may be a device that determines an expert unit most suitable for the input vector. For example, the routing unit 140 may calculate the score of each expert unit 130 for the input vector and determine the most suitable expert unit based on the calculated score. The routing unit 140 may perform a multiplication computation using a weight matrix on the input vector for a gating operation of determining an expert unit corresponding to the input vector. The weight matrix may refer to a matrix including one or more weights to be trained. For example, the routing unit 140 may calculate a routing score as illustrated in Equation 5 below.

$$\text{Routing Score} = x \cdot W + b \quad \text{(Equation 5)}$$

where, x represents a vector that is input to the routing unit 140, W represents a weight matrix including a trainable factor to calculate a routing score, and b represents a bias vector including a value corresponding to each of the plurality of expert units. If the dimension of the vector (x) input to the routing unit 140 is d and the number of the plurality of expert units is K, the weight matrix W used by the routing unit 140 in the computation process may be a matrix having a size of d×K.

Hereinafter, a method for processing natural language according to various examples will be described with reference to FIG. 4.

Figure 4:
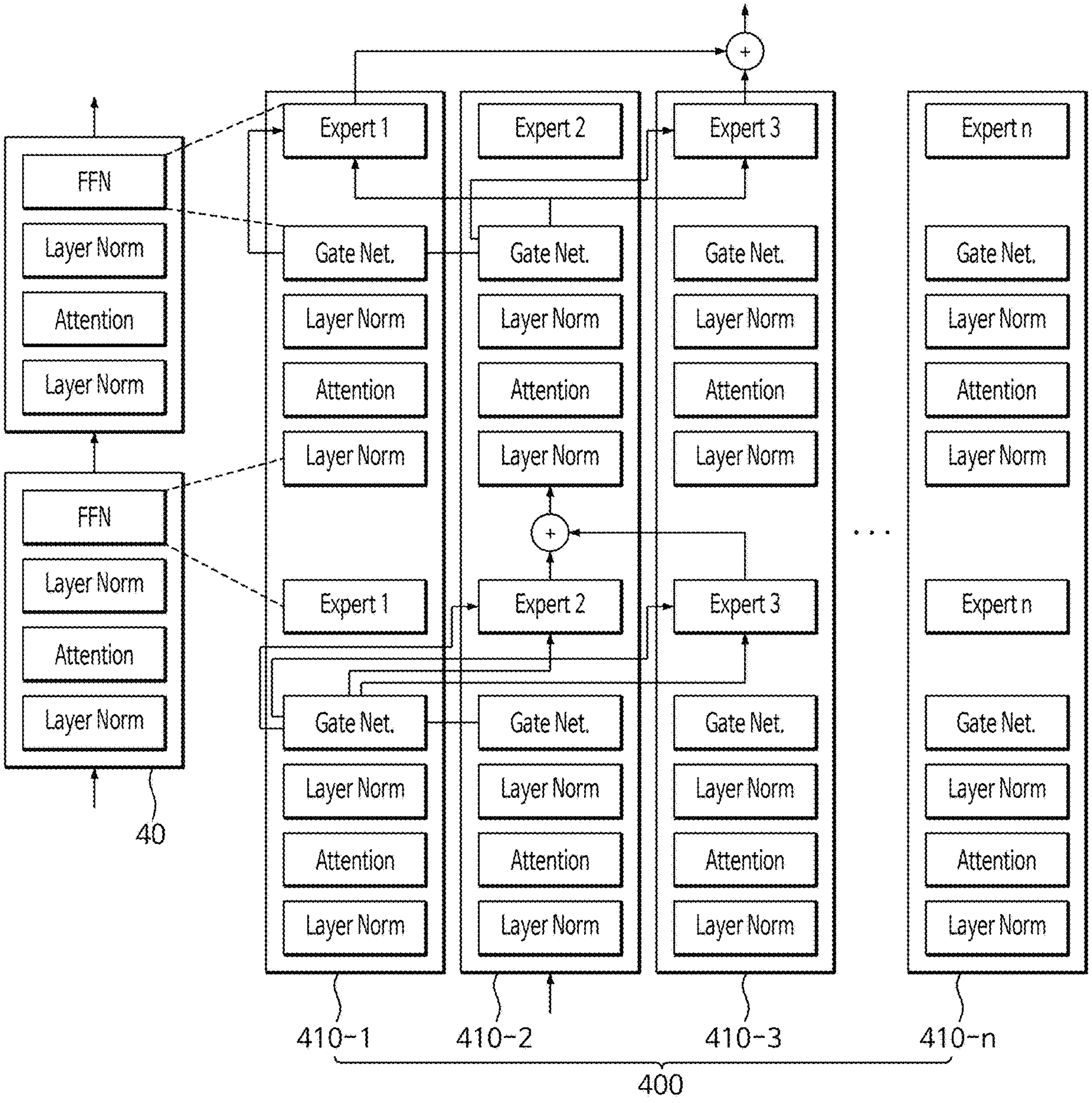
FIG. 4 is a conceptual diagram illustrating as an example a method for processing natural language.

FIG. 4 is a conceptual diagram illustrating as an example a method for processing natural language. In other words, FIG. 4 is a diagram conceptually representing a structure of a work module (or layer) in an encoder and/or decoder of an artificial neural network model, and a data process therein. A neural processing module 410 of FIG. 4 may include first to (n)th neural processing units 410-1 to **410-*n*. The (i)th neural processing unit may include a layer normalization unit (Layer Norm), a self-attention unit (Attention), a routing unit (Gate Net), and an Expert unit (Expert). More specifically, the plurality of neural processing units 410-1 to 410-*n* included in the neural processing module 410** may include a layer normalization unit, a self-attention unit, and a routing unit, which perform computations based on the same weight, and may also include independent expert units.

A reference numeral 40 of FIG. 4 illustrates a work unit module (or layer) in a related natural language processing model of an encoder-decoder structure. The related natural language processing module 40 has a structure that uses a single feed forward network (FFN) when computing a token sequence input through an encoder or decoder. On the other hand, a neural processing module 400 in some examples uses a method capable of separating a single feed forward network into a plurality of feed forward networks and performing natural language processing through expert units using each feed forward network.

In the example of FIG. 4, the layer normalization unit, the self-attention unit and the routing unit included in each of the plurality of neural processing units 410-1 to **410-*n* may be units that perform a computation based on the same parameter. In addition, the expert unit included in each of the plurality of neural processing units 410-1 to 410-*n* may be a unit that performs a computation based on at least some different parameters. In other words, the expert units included in each of the plurality of neural processing units 410-1 to 410-*n*** may each be configured to perform a specialized neural computation.

The routing unit of the neural processing unit may determine which expert unit is to compute the input vector. That is, the routing unit may calculate a routing score for each of the plurality of expert units by multiplying the input vector by the trainable weight matrix. The routing unit may determine one or more expert units according to the routing scores. For example, the routing unit may use only one expert unit having the highest routing score for subsequent computations. As another example, the routing unit may select k expert units in the order of higher routing score, compute the input vector through each expert unit, and generate the output vector based on the vectors calculated by the plurality of expert units. If the output vectors are generated through k expert units in the order of higher routing scores, the neural processing module 410 may perform weighted summing of the k expert unit output vectors according to the routing scores to finally generate the output vector of the module. For example, when it is assumed that the neural processing module 410 generates the final output vector using the results of two expert units, if the output vector of the expert unit with a routing score of 0.1 is $E_i$, and the output vector of the expert unit with a routing score of 0.9 is $E_j$, the final output vector may be calculated as $0.1E_i+0.9E_j$.

An example in which the output vector is generated by two top expert units having the highest routing scores calculated by the routing unit is described with reference to FIG. 4. In addition, in the example of FIG. 4, it is assumed that the second neural processing unit 410-2 receives an input vector. The second neural processing unit 410-2 may perform the layer normalization task, the attention task, etc. using the layer normalization unit and the self-attention unit with respect to the input vector. The second neural processing unit 410-2 may calculate a routing score for each of the plurality of expert units using the routing unit. For example, the routing score for each of the plurality of expert units calculated by the routing unit may be expressed as [$s_1$, $s_2$, $s_3$, . . . , $s_n$]. At this time, if the two top routing scores are $s_1$ and $s_3$, the second neural processing unit 410-2 may transmit the output of the routing unit to the first neural processing unit 410-1 and the third neural processing unit 410-3, respectively. The neural processing module 410 may use a plurality of neural processing units to share data with each other to generate an output of the module.

A plurality of neural processing units included in the neural processing module 410 may be trained end-to-end together with the routing unit. That is, because all the factors of the routing unit that selects the appropriate expert unit include trainable factors, a plurality of neural processing units each including a plurality of expert units may be trained together with the routing unit by the end-to-end training method.

Hereinafter, according to the first example in which the neural processing unit is implemented as a processor, it is assumed that the plurality of neural processing units illustrated in FIG. 4 correspond to each of the plurality of neural network processors 1000 included in the neural computing apparatus 10 of FIG. 1. In this case, the neural processing unit of FIG. 4 may be referred to as a neural network processor. The controller 1010 of the neural computing apparatus 10 may be configured such that a plurality of neural network processors share data through the data bus 1030.

Specifically, when performing a neural computation in the expert unit of the first neural network processor included in the plurality of neural network processors, the controller 1010 may be configured to share the computation output value of the first neural network processor with the other neural network processors through the data bus 1030.

For example, if it is determined that the expert unit included in the second neural network processor is the expert unit to process the value (intermediate vector) that is input to the routing unit of the first neural network processor, the controller 1010 may transmit (i.e., route) the value input to the routing unit of the first neural network processor to the expert unit of the second neural network processor. More specifically, the routing score for each of the plurality of expert units calculated by the routing unit included in the first neural network processor may be expressed as a matrix of length n such as [0.1, 0.9, 0.7, . . . , 0.2]. At this time, let us assume that the value (0.9) of the second element corresponding to the second neural network processor is the largest of the n element values. In this case, the controller 1010 may transmit the vector that is input to the routing unit of the first neural network processor to the expert unit of the second neural network processor. The controller 1010 may determine that the output of the expert unit of the second neural network processor is an input for the next computation.

In addition, for example, if it is determined that the expert unit included in each of the second and third neural network processors is the expert unit to process the value (intermediate vector) that is input to the routing unit of the first neural network processor, the controller 1010 may transmit (i.e., route) the value input to the routing unit of the first neural network processor to the expert units of the second and third neural network processors. More specifically, the routing score for each of the plurality of expert units calculated by the routing unit included in the first neural network processor may be expressed as a matrix of length n such as [0.1, 0.9, 0.7, . . . , 0.2]. At this time, let us assume that the value (0.9) of the second element corresponding to the second neural network processor and the value (0.7) of the third element corresponding to the third neural network processor are the largest and the second largest of the n element values, respectively. In this case, the controller 1010 may transmit the vector that is input to the routing unit of the first neural network processor to the expert units of the second and third neural network processors. The controller 1010 may perform element-by-element summing of the output value of the expert unit of the second neural network processor and the output value of the expert unit of the third neural network processor, or perform weighted summing according to routing unit scores (e.g., 0.9 and 0.7), to generate the next input value.

The controller 1010 may perform the routing process described above one or more times to generate an output value (vector) from the encoder or decoder module. Through the computation between chips including the routing process as described above, the natural language processing model may effectively generate the entire model result by using only some of the plurality of expert units included in each of the plurality of chips.

By storing the data in the main memory 1020 and using the stored data, the second neural network processor that transmits data and the first and third neural network processors that receive the data may share the data by accessing one same storage space. In other words, if the routing unit of the second neural network processor selects the expert units of the first and third neural network processors (i.e., if a data sharing event occurs), the controller 1010 may share data computed so far by the second neural network processor (e.g., context vectors for the token sequence up to the current step) to the main memory 1020 for use by the control units of the first and third neural network processors.

In another example, the first and third neural network processors may cache the data received from the second neural network processor in their respective internal memories 150. In this case, if the routing unit of the second neural network processor selects the expert units of the first and third neural network processors, the controller 1010 may transmit the data computed so far by the second neural network processor to the first and third neural network processors through the data bus 1030.

Hereinafter, a second example in which the neural processing unit is implemented as a core will be described with reference to FIGS. 5 and 6. In the present disclosure, if the neural processing unit is implemented as a core, an electronic device including one or more cores may be referred to as a neural computing processor.

Figure 5:
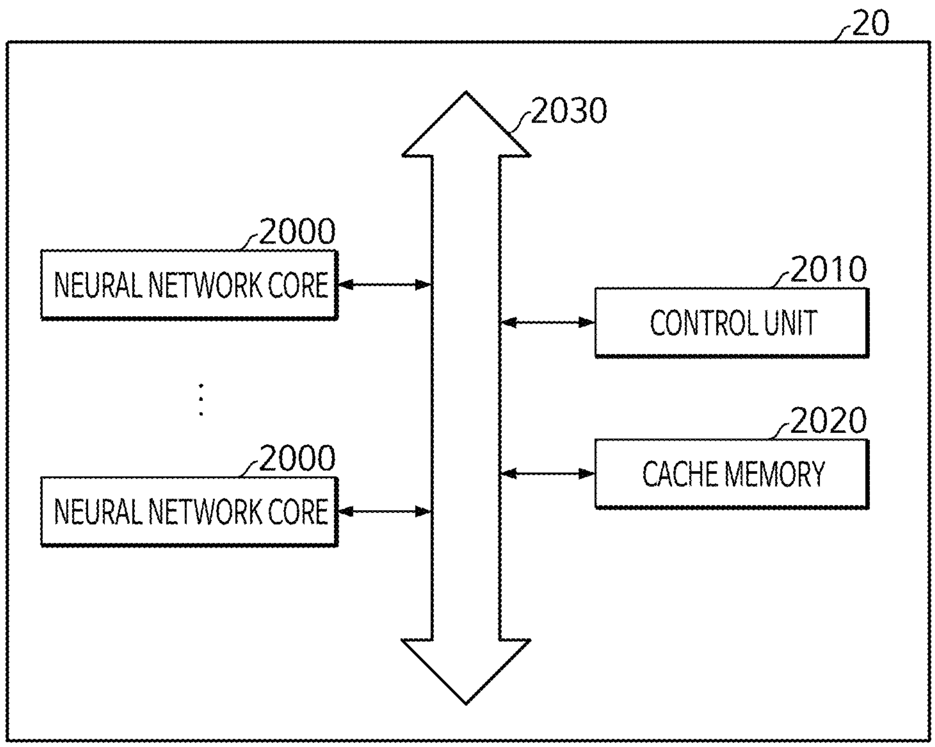
FIG. 5 is a conceptual diagram illustrating a neural computing processor according to an example of the present disclosure.

FIG. 5 is a conceptual diagram illustrating a neural computing processor.

Referring to FIG. 5, a neural computing processor 20 may include at least one neural network core 2000, a control unit 2010, a cache memory 2020, and a data bus 2030.

The neural network core 2000 may be a core for performing an artificial neural network-related computation. The neural network core 2000 may be a device for performing the same or similar task as the neural network processor 1000 described with respect to FIGS. 1 and 2. The neural network core 2000 may be a core for neural computation that processes, in parallel, computations to be performed by the neural computing processor 20 to reduce the computational burden of the neural computing processor 20. The neural network core 2000 may be a semiconductor implemented by an electric/electronic circuit (e.g., including a transistor, a capacitor, etc.).

The control unit 2010 may be a general-purpose core for overall control of the neural computing processor 20. The control unit 2010 may be a kind of host that provides instructions to each of one or more neural network cores 2000. That is, the neural network core 2000 may independently perform an artificial neural network-related computation according to the instruction from the control unit 2010. The neural network core 2000 may access the cache memory 2020 to perform the artificial neural network-related computation.

The cache memory 2020 may be a device for storing the data used by the control unit 2010 or one or more neural network cores 2000. For example, the cache memory 1020 may be a system memory such as an L1 cache memory, an L2 cache memory, etc.

The components included in the neural computing processor 20 may communicate with each other through the data bus 2030, respectively.

Figure 6:
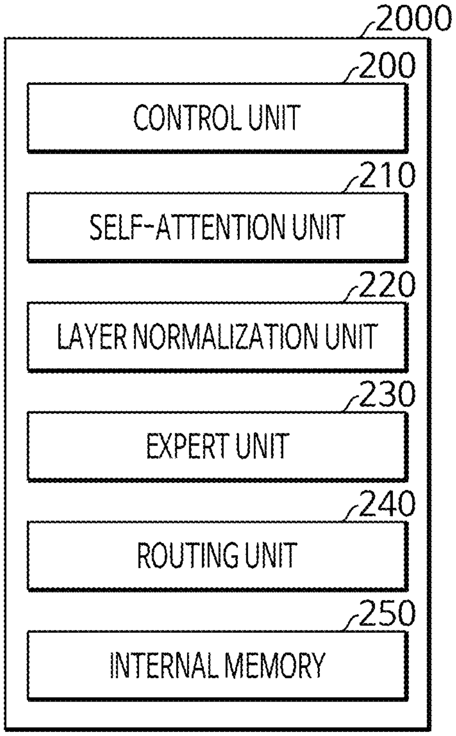
FIG. 6 is a block diagram provided to explain the neural network core of FIG. 5 in detail.

FIG. 6 is a block diagram provided to explain the neural network core of FIG. 5 in detail;

Referring to FIG. 6, the neural network core 2000 may include a control unit 200, a self-attention unit 210, a layer normalization unit 220, an expert unit 230, a routing unit 240, and an internal memory 250. Each of the control unit 200, the self-attention unit 210, the layer normalization unit 220, the expert unit 230, and the routing unit 240 may be a semiconductor circuit with a large number of connected transistors.

In general, in view of the fact that the core included in the processor performs computations in parallel with the controller of the processor by using an independent control device, it can be understood that, among the plurality of components illustrated in FIG. 6, the components corresponding to those illustrated in FIG. 2 perform the same or similar operations. Therefore, in the following description, duplicate description will be omitted and the differences will be mainly described.

The control unit 200 is an arithmetic/logical computation device ALU and may be a circuit including an arithmetic computation module that performs arithmetic computations (add, subtract, multiply, divide, etc.) and a logic computation module that performs logical computations (AND, OR, NOT, XOR, etc.). The control unit 200 may receive, as an input, instructions, processor state signals, and/or clocks, etc. from the control unit 2010 of FIG. 4 and generate a control signal for controlling the self-attention unit 210, the layer normalization unit 220, the expert unit 230, the routing unit 240, and the internal memory 250.

The internal memory 250 may be a register that exists separately from the cache memory 2020. The internal memory 250 may be a register configured to store weights, kernels, and/or feature maps necessary for the computation of each unit included in the neural network core 2000. For example, the internal memory 250 may include a memory buffer register, an accumulator register, a status register, etc.

The internal memory 250 may be a storage device for storing instructions and/or data read by the neural network core 2000 from other components of the neural computing processor 20, parameter values used by other units included in the neural network core 2000, computation result values generated by the control unit 200, states of the neural network core 2000, etc.

Hereinafter, according to the second example in which the neural processing unit is implemented as a core, it is assumed that the plurality of neural processing units illustrated in FIG. 4 correspond to each of the plurality of neural network cores 2000 included in the neural computing processor 20 of FIG. 5. In this case, the neural processing unit of FIG. 4 may be referred to as a neural network core. The control unit 2010 of the neural computing processor 20 may be configured such that a plurality of neural network cores share data through the data bus 2030.

Specifically, when performing a neural computation in the expert unit of the first neural network core included in the plurality of neural network cores, the control unit 2010 may be configured to share the computation output value of the first neural network core with the other neural network cores through the data bus 2030.

For example, if it is determined that the expert unit included in the second neural network core is the expert unit to process the value (intermediate vector) that is input to the routing unit of the first neural network core, the control unit 2010 may transmit (i.e., route) the input value input to the routing unit of the first neural network core to the expert unit of the second neural network core. More specifically, the routing score for each of the plurality of expert units calculated by the routing unit included in the first neural network core may be expressed as a matrix of length n such as [0.1, 0.9, 0.7, . . . , 0.2]. In this case, let us assume that the value (0.9) of the second element corresponding to the second neural network core is the largest of the n element values. In this case, the control unit 2010 may transmit the vector that is input to the routing unit of the first neural network core to the expert unit of the second neural network core. The control unit 2010 may determine that the output of the expert unit of the second neural network core is an input for the next computation.

In addition, for example, if it is determined that the expert unit included in each of the second and third neural network cores is the expert unit to process the value (intermediate vector) that is input to the routing unit of the first neural network core determines, the control unit 2010 may transmit (i.e., route) the value input to the routing unit of the first neural network core to the expert units of the second and third neural network cores. More specifically, the routing score for each of the plurality of expert units calculated by the routing unit included in the first neural network core may be expressed as a matrix of length n such as [0.1, 0.9, 0.7, . . . , 0.2]. At this time, let us assume that the value (0.9) of the second element corresponding to the second neural network core and the value (0.7) of the third element corresponding to the third neural network core are the largest and the second largest of the n element values, respectively. In this case, the control unit 2010 may transmit the vector that is input to the routing unit of the first neural network core to the expert units of the second and third neural network cores. The control unit 2010 may perform element-by-element summing of the output value of the expert unit of the second neural network core and the output value of the expert unit of the third neural network core, or perform weighted summing according to routing unit scores (e.g., 0.9 and 0.7), to generate the next input value.

Through the computation between cores including the routing process as described above, the natural language processing model may effectively generate the entire model result by using only some of the plurality of expert units included in each of the plurality of cores.

By storing the data in the cache memory 2020 and using the stored data, the second neural network core that transmits the data and the first and third neural network cores that receive the data may share the data by accessing one same storage space. In other words, if the routing unit of the second neural network core selects the expert units of the first and third neural network cores (i.e., if a data sharing event occurs), the control unit 2010 may share the data computed so far by the second neural network core (e.g., context vectors for the token sequence up to the current step) to the cache memory 2020 for use by the control unit of the first and third neural network cores.

In another example, the first and third neural network cores may cache the data received from the second neural network core in their respective internal memories 250. In this case, if the routing unit of the second neural network core selects the expert unit of the first and expert unit of the third neural network cores, the control unit 2010 may transmit the data computed so far by the second neural network core to the first and third neural network cores through the data bus 2030.

Hereinafter, a third example in which the neural processing unit is implemented as a node will be described with reference to FIGS. 7 to 8. In the present disclosure, if the neural processing unit is implemented as a node, a system including one or more nodes may be referred to as a neural computing system.

Figure 7:
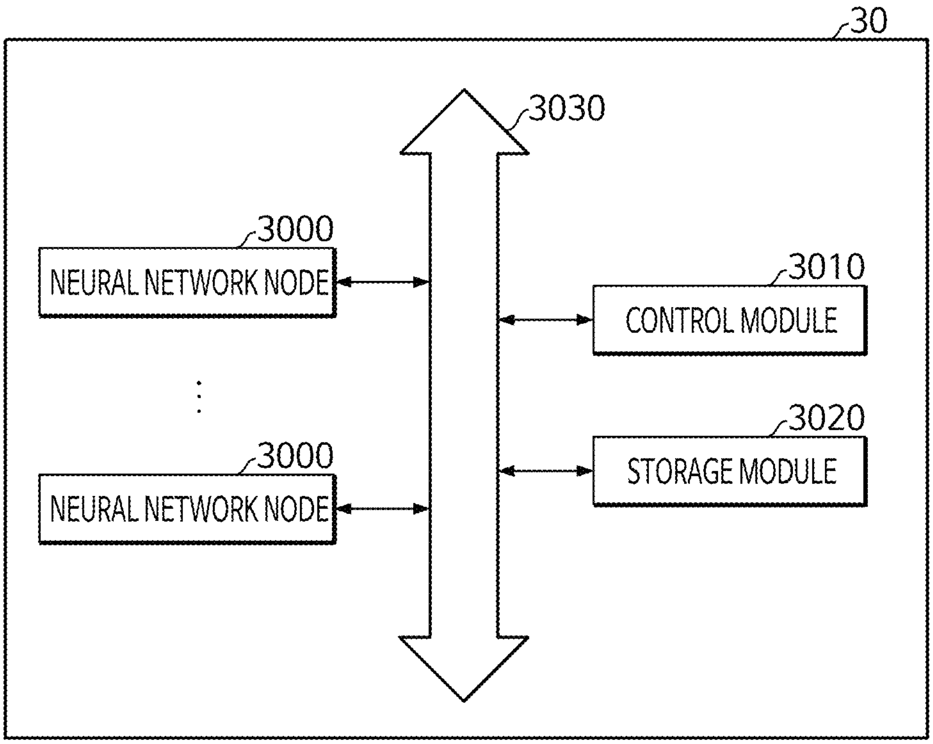
FIG. 7 is a conceptual diagram illustrating a neural computing system according to an example of the present disclosure.

FIG. 7 is a conceptual diagram illustrating a neural computing system.

Referring to FIG. 7, a neural computing system 30 may include at least one neural network node 3000, a control module 3010, a storage module 3020, and a communication network 3030.

The neural network node 3000 may be a node for performing an artificial neural network-related computation. The neural network node 3000 may be a device for performing the same or similar task as the neural network processor 1000 described with respect to FIGS. 1 and 2. The neural network node 3000 may be an electronic device that performs a natural language processing operation according to examples of the present disclosure. For example, the neural network node 3000 may be at least one of an application server, a proxy server, a cloud server, a smartphone, a tablet computer, a personal computer (PC), a mobile phone, a personal digital assistant (PDA), an audio player, and a wearable device.

The control module 3010 may refer to a set of one or more processors. The control module 3010 may drive software (e.g., commands, programs, etc.) to control at least one component of the neural computing system 30 connected to the control module 3010. The control module 3010 may be a general-purpose processor for controlling a computation between a plurality of neural network nodes 3000. The control module 3010 may perform various operations including computation, processing, data generation or processing, etc. In addition, the control module 3010 may load or store data, etc. from or in the storage module 3020.

The storage module 3020 may store various pieces of data. The data stored in the storage module 3020 is data acquired, processed, or used by at least one component of the neural computing system 30, and may include software (e.g., commands, programs, etc.). The storage module 3020 may include a volatile or non-volatile memory.

The communication network 3030 may allow data exchange between the control module 3010, the storage module 3020, and the plurality of neural network nodes 3000. For example, a wired communication network may include a communication network based on methods such as a universal serial bus (USB), a high definition multimedia interface (HDMI), a recommended standard-232 (RS-232), a plain old telephone service (POTS), etc. For example, a wireless communication networks may include communication networks according to methods of enhanced mobile broadband (eMBB), ultra reliable low-latency communications (URLLC), and massive machine type communications (MMTC), Long-Term Evolution (LTE), LTE Advance (LTE-A), New Radio (NR), universal mobile telecommunications system (UMTS), global system for mobile communications (GSM), code division multiple access (CDMA), wideband CDMA (WCDMA), etc. The communication network 3030 is not limited to the examples described above and may include, without limitation, various types of communication networks that allow data exchange between a plurality of entities or devices.

Figure 8:
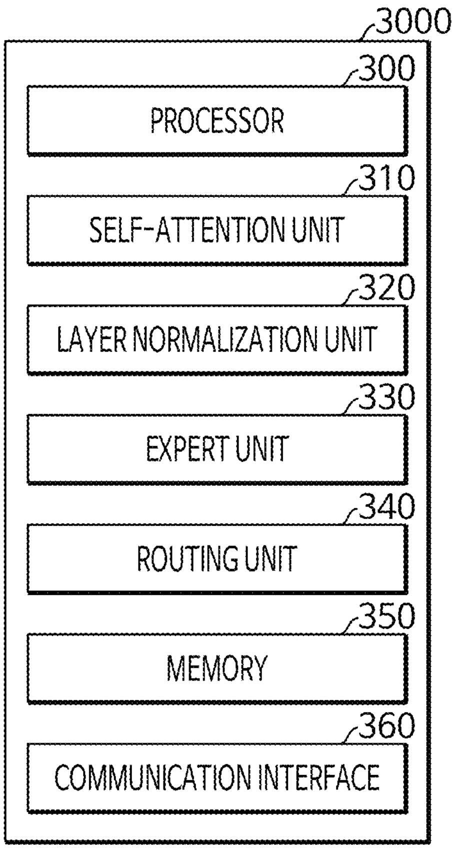
FIG. 8 is a block diagram provided to explain the neural network node of FIG. 7 in detail.

FIG. 8 is a block diagram provided to explain the neural network node of FIG. 7 in detail.

Referring to FIG. 8, the neural network node 3000 may include a processor 300, a self-attention unit 310, a layer normalization unit 320, an expert unit 330, a routing unit 340, a memory 350, and a communication interface 360.

The neural network node of FIG. 8 may be a device including an independent control unit (processor) and an independent storage device (memory) and performs the same tasks as the neural network processor of FIG. 2 that includes an independent control unit (processor) and an independent storage device (memory). Accordingly, it can be understood that, among the plurality of components illustrated in FIG. 8, the components corresponding to the components illustrated in FIG. 2 perform the same or similar operations. In the following description, duplicate description will be omitted and the differences will be mainly described.

The processor 300 may drive software (e.g., a command, a program, etc.) to control at least one component of the neural network node 3000 connected to the processor 300. In addition, the processor 300 may perform various operations such as computation, processing, data generation or processing, etc.

The communication interface 360 may perform wireless or wired communication between the neural network node 3000 and another device (e.g., another neural network node 3000 or another server). For example, the communication interface 360 may perform wireless communication based on methods such as eMBB, URLLC, MMTC, LTE, LTE-A, NR, UMTS, GSM, CDMA, WCDMA, WiBro, WiFi, Bluetooth, NFC, GPS, GNSS, etc. In addition, for example, the communication interface 360 may perform wired communication based on methods such as universal serial bus (USB), high definition multimedia interface (HDMI), Recommended Standard-232 (RS-232), Plain Old Telephone Service (POTS), etc.

Hereinafter, according to the third example in which the neural processing unit is implemented as a node, it will be assumed that the plurality of neural processing units illustrated in FIG. 4 correspond to each of the plurality of neural network nodes 3000 included in the neural computing system 30 of FIG. 7. In this case, the neural processing unit of FIG. 4 may be referred to as a neural network node. The storage module 3020 of the neural computing system 30 may be configured such that a plurality of neural network nodes share data through the communication network 3030.

Specifically, when performing a neural computation in the expert unit of the first neural network node included in the plurality of neural network nodes, the control module 3010 may be configured to share a computation output value of the first neural network node to other neural network nodes through the communication network 3030.

For example, if it is determined that the expert unit included in the second neural network node is the expert unit to process the value (intermediate vector) that is input to the routing unit of the first neural network node, the control module 3010 may transmit (i.e., route) the value input to the routing unit of the first neural network node to the expert unit of the second neural network node. More specifically, the routing score for each of the plurality of expert units calculated by the routing unit included in the first neural network node may be expressed as a matrix of length n such as [0.1, 0.9, 0.7, . . . , 0.2]. In this case, let us assume that the value (0.9) of the second element corresponding to the second neural network node is the largest of the n element values. In this case, the control module 3010 may transmit the vector that is input to the routing unit of the first neural network node to the expert unit of the second neural network node. The control module 3010 may determine that the output of the expert unit of the second neural network node is an input for the next computation.

In addition, for example, if it is determined that the expert unit included in each of the second and third neural network nodes is the expert unit to process the value (intermediate vector) that is input to the routing unit of the first neural network node, the control module 3010 may transmit (i.e., route) the value input to the routing unit of the first neural network node to the expert unit of the second and third neural network nodes. More specifically, the routing score for each of the plurality of expert units calculated by the routing unit included in the first neural network node may be expressed as a matrix of length n such as [0.1, 0.9, 0.7, . . . , 0.2]. At this time, let us assume that the value (0.9) of the second element corresponding to the second neural network node and the value (0.7) of the third element corresponding to the third neural network node are the largest and the second largest of the n element values, respectively. In this case, the control module 3010 may transmit the vector that is input to the routing unit of the first neural network node to the expert units of the second and third neural network nodes. The control module 3010 may perform element-by-element summing of the output value of the expert unit of the second neural network node and the output value of the expert unit of the third neural network node, or weighted summing according to routing unit scores (e.g., 0.9 and 0.7), to generate the next input value.

Through the computation between node including the routing process as described above, the natural language processing model may effectively generate the entire model result by using only some of the plurality of expert units included in each of the plurality of nodes.

For example, the second neural network node that transmits the data and the first and third neural network nodes that receive the data may share the data by storing the data in the storage module 3020 and accessing one same storage space to use the storage module 3020 as a shared storage device. In other words, if the routing unit of the second neural network node selects the expert units of the first and third neural network nodes (i.e., if a data sharing event occurs), the control module 3010 may store the data computed so far by the second neural network node (e.g., context vectors for the token sequence up to the current step) in the storage module 3020 for use by the control unit of the first and third neural network nodes.

In another example, the first and third neural network nodes may cache the data received from the second neural network node in their respective memories 350. In this case, if the routing unit of the second neural network node selects the expert unit of the first neural network node and the expert unit of the third neural network node, the control module 3010 may transmit the data computed so far by the second neural network node to the first and third neural network nodes through the communication network 3030.

As described above, compared to when the natural language processing is performed using a single feed forward network, performing neural computations using a plurality of expert units through data sharing makes it possible to train each specialized feed forward network model, and this allows to select a more effective model according to the type or characteristics of a specific input text and thus further improves natural language processing ability. In addition, rather than processing natural language by computing one single network including a large number of parameters each time, activating only the parameters of some expert units selected by the routing unit provides the effect of significantly reducing the overall computational cost of natural language processing.

In general, the decoder module of the natural language processing model generates the next token based on an input query (i.e., token sequence). In this case, the decoder module use the generated token as part of the input again to finally generate an output. Specifically, when it is assumed that the length of the query (token sequence) input to the decoder module in any step t is L and one subsequent token is generated by the decoder module, in the next step, that is, in step t+1, the decoder module may receive, as an input query, a token sequence obtained by connecting the subsequent token generated in step t to the input query in step t and then generate the subsequent token. In this way, a decoder module-based model takes on a recursive form in which the generated output value is part of the input again. Meanwhile, except for the newly added query token in the previous step, attention values for the remaining query tokens have already been computed, and accordingly, key values (also known as "key tokens"), value values (also known as "value tokens") or attention values (also known as "attention tokens"), etc. corresponding to each of the query tokens may be cached in a specific storage space and reused. In the following description, a method of storing key values, value values, attention values, etc. corresponding to the query token of the previous step in the specific storage space and reusing the same in a subsequent step may be briefly referred to as a "K-V cache".

Figure 9:
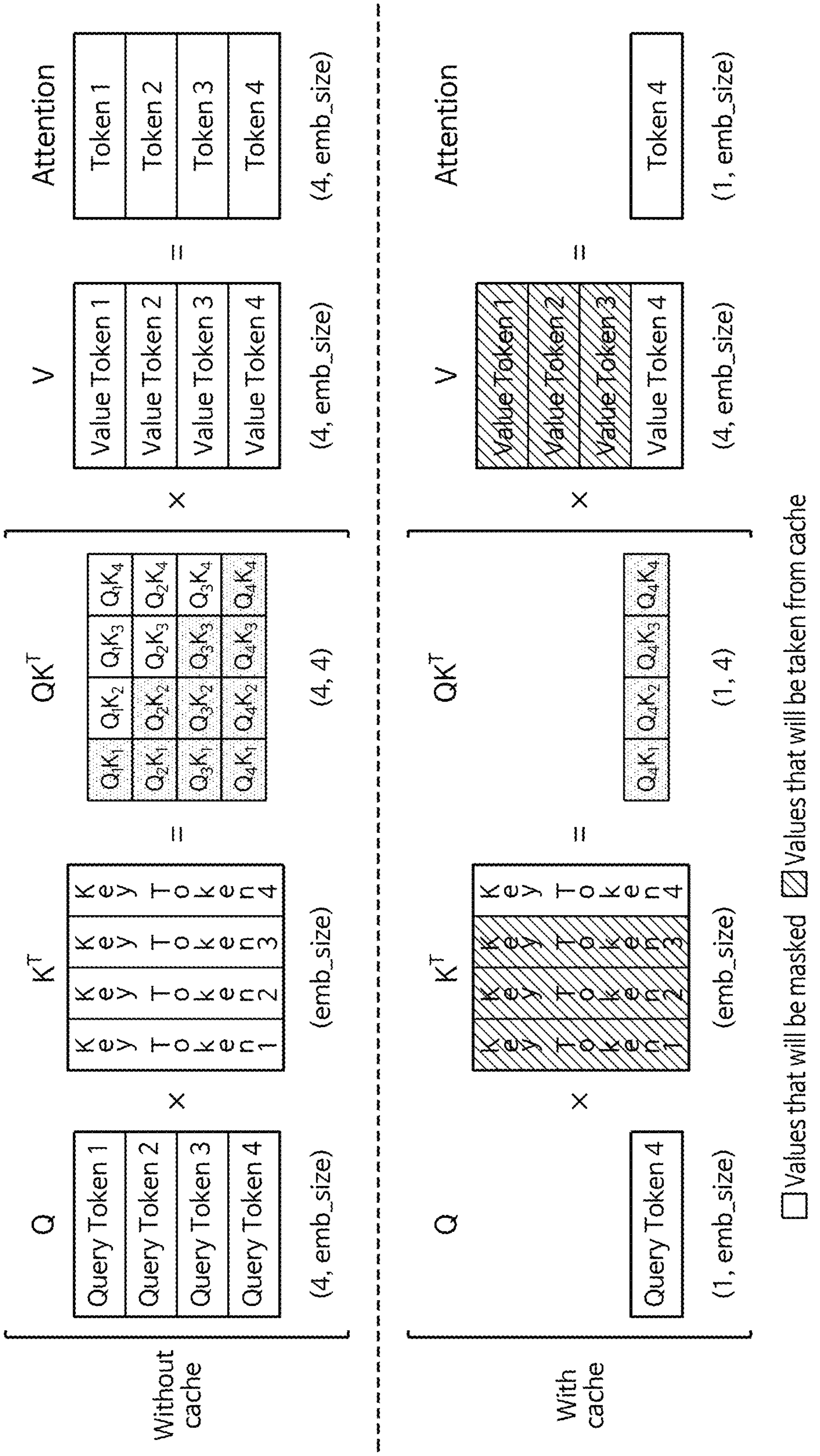
FIG. 9 is a conceptual diagram illustrating calculating an attention score using a K-V cache according to an example of the present disclosure.

FIG. 9 is a conceptual diagram illustrating calculating an attention score using a K-V cache. FIG. 9 illustrates, as an example, a fourth step of computational steps repeatedly performed by the decoder module included in the natural language processing model, showing the difference between when the K-V cache is used and when the K-V cache is not used. If the K-V cache is not used as illustrated, the decoder module calculates query (Q), key (K), and value (V) values for the entire input vector (i.e., input token sequence) and computes an attention score. A detailed example of calculating Q, K, and V from the input vector and calculating the attention score has been described above with reference to Equation 2, and redundant descriptions are omitted. In this case, the attention score corresponding to the previous query tokens (Query Token 1, Query Token 2, and Query Token 3) excluding the newly added query token (Query Token 4) in Step 4 may be a value already calculated at least once in the previous steps. On the other hand, with the K-V cache, the decoder module may compute the overall attention score for the input vector by loading and using the attention value of the existing query tokens from the storage space and performing an attention score computation only on the newly added query token (Query Token 4) to calculate the overall attention score for the input vector.

Meanwhile, if natural language processing is performed according to the K-V cache method, only some of a plurality of chips may operate using the plurality of chips, and as a result, the K-V cache data referenced by each of the chips may be different from each other. For example, by referring to FIG. 4 again, if the synchronization of the K-V cache data is not achieved between a plurality of chips, the K-V cache may be updated only in the attention unit of the first chip 410-1 in the first attention layer, and the K-V cache may be updated only in the attention unit of the second chip 410-2 in the second attention layer. As described above, if the K-V cache is updated in only some of a plurality of chips, the individual chips recognize the input sequence differently, hindering smooth natural language processing.

Therefore, in an example in which a plurality of chips are used, a process of synchronizing K-V cache data referenced by each of the plurality of chips is required, and this will be described in detail below.

In a first example of synchronizing the K-V cache data, the controller of the neural computing apparatus may transmit the input token sequence to, among the plurality of chips, each of the chips other than the first chip that performed the attention computation on the input token sequence. As a result, the attention unit included in, among the plurality of chips, each of the chips other than the first chip that performed the attention computation on the input token sequence may calculate an attention score for the token sequence. In this case, each of the plurality of chips may store the K-V cache data in the internal memory 150 included in each chip. In the first example of synchronizing the K-V cache data, the synchronization process may be performed collectively on the plurality of chips after the final subsequent token is determined in any step t, or may be simultaneously performed in parallel while performing a computation through a plurality of layers to determine a subsequent token each step. As a result, each of the plurality of chips included in the neural computing apparatus may maintain the same K-V cache data.

In a second example of the synchronizing K-V cache data, the plurality of chips may share the K-V cache data through the main memory 1020. That is, among the plurality of chips, the first chip that performed the attention computation on the input token sequence may store, in the main memory 1020, the K-V cache data derived in the process of calculating the attention score. As a result, among the plurality of chips, any chip (including the first chip) to perform a computation in the subsequent step may load the K-V cache data from the main memory 1020 and reuse the key value, value value, and/or attention value corresponding to the previous query token to calculate an attention score for the input query of the current step. That is, each of the plurality of chips included in the neural computing apparatus may synchronize the K-V cache data by using a single piece of K-V cache data read and written in the main memory 1020.

In a third example of synchronizing the K-V cache data, the plurality of chips may share a key-value pair according to a ring-type data sharing method. Specifically, among the plurality of chips, the first chip that performed the attention computation on the input token sequence may transmit a newly generated K-V pair to another chip in the process of calculating an attention score. The "newly generated K-V pair" refers to new data to be newly added to the K-V cache data, and referring again to FIG. 8 showing the corresponding example, it may refer to a key token (Key Token 4), a value token (Value Token 4), and/or an attention token (Attention Token 4) corresponding to the query token (Query Token 4) of Step 4.

Figure 10:
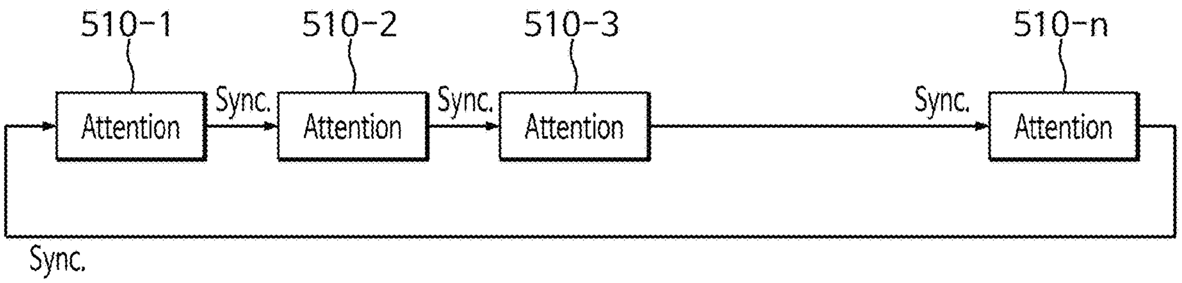
FIG. 10 is a conceptual diagram conceptually illustrating a ring-type data sharing method.

FIG. 10 is a conceptual diagram conceptually illustrating a ring-type data sharing method. Each of attention units 510-1, 510-2, 510-3, . . . , **510-*n* illustrated in FIG. 10 represents an attention unit included in each of the plurality of chips. The ring-type data sharing method is a concept that contrasts with the data sharing method of a master-slave structure in which entities give and receive data in 1-to-N manner. That is, it refers to a data sharing method in which each entity transfer data to another entity while simultaneously receiving the data. With the ring-type data sharing method, data transmit and update events may occur according to a certain order between elements, as in a linked list. Specifically, if data sharing is started by the first attention unit 510-1, the first attention unit 510-1 may transmit data to the second attention unit 510-2, and the second attention unit 510-2 may store the transmitted data and then transmit the data to the third attention unit 510-3. Through this sequential transmission and storage operation, the first attention unit 510-1 finally receives data from the n-th attention unit 510-*n*, and thus the entire data sharing process may be terminated. In another example, if data sharing is started by the second attention unit 510-2, the second attention unit 510-2 may transmit the data to the third attention unit 510-3, and the third attention unit 510-3 may store the transmitted data and then transmit that data to the fourth attention unit. Through this sequential transmission and storage operation, the second attention unit 510-2 finally receives data from the first attention unit 510-1**, and thus the entire data sharing process may be terminated. The order of data sharing and transmission direction described above are only some examples provided for explanation, and aspects are not limited thereto.

As described above, if ring-type data sharing is employed, a plurality of chips may reference the same K-V cache data. In addition, with the data sharing method of the master-slave structure, the entity providing the data bears a heavy computational burden compared to the entity receiving the data, which may slow down the processing time. On the other hand, with the ring-type data sharing method according to the examples of the disclosure, individual entities may share the burden of data sharing equally, so that resources can be used efficiently and the data sharing process can be achieved in less time. In addition, rather than sharing the entire K-V cache data of terabyte size or larger, only newly generated K-V pairs (i.e., key value data pairs) are shared by the ring-type method, so the size of the data targeted for sharing is small, allowing more efficient data sharing.

Although it has been described that the natural language processing method is implemented through a plurality of chips in some examples of synchronizing K-V cache data, it is obvious that the chips are illustrated as an example of the entity to perform the neural computation for convenience of explanation, and the corresponding examples may equally be performed through a plurality of cores or a plurality of nodes.

For example, if the method for processing natural language according to examples of present disclosure is performed by the neural computing processor 20 of FIG. 5, synchronizing the K-V cache data may be performed between a plurality of neural network cores. In this case, the K-V cache data may be stored in the internal memory 250 of the individual neural network core 2000 or shared through the cache memory 2020 of the neural computing processor 20.

For example, if the method for processing natural language according to examples of the present disclosure is performed by the neural computing system 30 of FIG. 7, K-V cache data synchronization may be performed between a plurality of neural network nodes. In this case, the K-V cache data may be stored in the memory 350 of the individual neural network node 3000 or shared through the storage module 3020 of the neural computing system 30.

In describing a sequence of operations according to some examples, the operations or steps of the method or algorithm are described in certain order, but it is to be noted that each step may be performed not only sequentially, but also in an order that may be arbitrarily combined. The description of the sequence of operations does not exclude the application of changes or modifications to the method or algorithm, and does not mean that any step of operation is essential or desirable. At least some of the operations may be performed in parallel, iteratively, or heuristically. At least some of the operations may be omitted, or another operation may be added.

Various examples according to the disclosure may be implemented as software in a machine-readable storage medium. The software as used herein may refer to software for implementing various examples of the disclosure. The software may be inferred from various examples of the disclosure by the programmers in the technical field to which the present disclosure belongs. For example, the software may refer to a program including a machine-readable command (e.g., code or code segment). The "machine" as used herein may refer to a machine capable of operating according to a command called from a storage medium, and may be a computer, for example. The machine may be a computing machine according to various examples of the present disclosure. The processor of the machine may execute a called command to cause components of the machine to perform a function corresponding to the command. The processor may be the processors 110 and 210 according to examples of the present disclosure. The storage medium may refer to any type of machine-readable recording medium that stores data. For example, the storage medium may include ROM, RAM, CD-ROM, magnetic tape, floppy disk, optical data storage device, etc. The storage medium may be the memories 130 and 230. The storage medium may be implemented in a form distributed to computer systems, etc. connected to a network. The software may be distributed and stored in the computer system, etc. and executed. The storage medium may be a non-transitory storage medium. The non-transitory storage medium refer to a tangible medium, regardless of whether the data is stored semi-permanently or temporarily, and does not include a transiently-propagating signal.

Although the technical idea according to the present disclosure has been described by referring to various examples, the technical idea according to the present disclosure includes various substitutions, modifications, and changes that may be made within a range understood by those skilled in the art to which the present disclosure belongs. Further, it should be understood that such substitutions, variations and changes may be included within the scope of the attached claims.

The invention claimed is:

1. A method for processing natural language, wherein the method is performed in a neural computing apparatus comprising a plurality of chips, a controller configured to control the plurality of chips, and a memory that stores data accessible to the plurality of chips, and wherein the method comprises:

acquiring a token sequence comprising one or more tokens;

performing, using the plurality of chips, a computation on the token sequence; and determining a subsequent token of the token sequence as a result of the computation, wherein the performing of the computation on the token sequence comprises:

by a self-attention unit included in a first chip of the plurality of chips, determining an attention score for the token sequence by using key-value (K-V) cache data, by a routing unit included in the first chip, determining that an expert unit included in a second chip of the plurality of chips is an expert unit corresponding to the token sequence, and by the expert unit of the second chip, performing a neural computation based on an output of the self-attention unit of the first chip for the token sequence, wherein the method further comprises transmitting, by the first chip, a key-value (K-V) pair that is newly generated in a process of determining the attention score to a third chip of the plurality of chips, wherein the newly generated K-V pair comprises at least one of a key token, a value token, or an attention token corresponding to a new query token, wherein the plurality of chips share the newly generated K-V pair according to a ring- type data sharing method, and wherein, according to the ring-type data sharing method, the third chip stores the newly generated K-V pair transmitted from the first chip and transmits the newly generated K-V pair to another chip of the plurality of chips through a sequential transmission and storage operation so that the K-V cache data referenced by each of the plurality of chips is synchronized.

2. The method according to claim 1, wherein each of the plurality of chips comprises a self-attention unit configured to determine an attention score, a layer normalization unit configured to perform a layer-level normalization computation, an expert unit configured to perform a neural computation, and a routing unit configured to select an expert unit suitable for a specific neural computation.

3. The method according to claim 1, further comprising, by a self-attention unit included in each of chips other than the first chip of the plurality of chips, determining the attention score for the token sequence.

4. A method for processing natural language, wherein the method is performed in a neural computing processor comprising a plurality of cores, a controller configured to control the plurality of cores, and a memory that stores data accessible to the plurality of cores, and wherein the method comprises:

acquiring a token sequence comprising one or more tokens;

performing, using the plurality of cores, a computation on the token sequence; and determining a subsequent token of the token sequence as a result of the computation, wherein the performing of the computation on the token sequence comprises:

by a self-attention unit included in a first core of the plurality of cores, determining an attention score for the token sequence by using key-value (K-V) cache data, by a routing unit included in the first core determining that an expert unit included in a second core of the plurality of cores is an expert unit corresponding to the token sequence, and by the expert unit of the second core, performing a neural computation based on an output of the self-attention unit of the first core for the token sequence, wherein the method further comprises transmitting, by the first core, a key-value (K-V) pair that is newly generated in a process of determining the attention score to a third core of the plurality of cores, wherein the newly generated K-V pair comprises at least one of a key token, a value token, or an attention token corresponding to a new query token, wherein the plurality of cores share the newly generated K-V pair according to a ring- type data sharing method, and wherein, according to the ring-type data sharing method, the third core stores the newly generated K-V pair transmitted from the first core and transmits the newly generated K-V pair to another core of the plurality of cores through a sequential transmission and storage operation so that the K-V cache data referenced by each of the plurality of cores is synchronized.

5. The method according to claim 4, wherein each of the plurality of cores comprises a self-attention unit configured to determine an attention score, a layer normalization unit configured to perform a layer-level normalization computation, an expert unit configured to perform a neural computation, and a routing unit configured to select an expert unit suitable for a specific neural computation.

6. The method according to claim 4, further comprising, by a self-attention unit included in each of cores other than the first core of the plurality of cores, determining the attention score for the token sequence.

7. A method for processing natural language, wherein the method is performed in a neural computing system comprising a plurality of nodes that are coupled to a communication interface and to an input and output interface, a controller configured to control the plurality of nodes, and a memory that stores data accessible to the plurality of nodes, and wherein the method comprises:

acquiring a token sequence comprising one or more tokens;

performing, using the plurality of nodes, a computation on the token sequence; and determining a subsequent token of the token sequence as a result of the computation, wherein the performing of the computation on the token sequence comprises;

by a self-attention unit included in a first node of the plurality of nodes, determining an attention score for the token sequence by using key-value (K-V) cache data, by a routing unit included in the first node, determining that an expert unit included in a second node of the plurality of nodes is an expert unit corresponding to the token sequence, and by the expert unit of the second node, performing a neural computation based on an output of the self-attention unit of the first node for the token sequence, wherein the method further comprises transmitting, by the first node, a key-value (K-V) pair that is newly generated in a process of determining the attention score to a third node of the plurality of nodes, wherein the newly generated K-V pair comprises at least one of a key token, a value token, or an attention token corresponding to a new query token, wherein the plurality of nodes share the newly generated K-V pair according to a ring- type data sharing method, and wherein, according to the ring-type data sharing method, the third node stores the newly generated K-V pair transmitted from the first node and transmits the newly generated K-V pair to another node of the plurality of nodes through a sequential transmission and storage operation so that the K-V cache data referenced by each of the plurality of nodes is synchronized.

* * * * *